(12) United States Patent
Uezaki et al.

(10) Patent No.: US 6,499,316 B2
(45) Date of Patent: Dec. 31, 2002

(54) METHOD OF PRODUCING A GLASS GOB, METHOD OF PRODUCING A GLASS MOLDED PRODUCT, AND APPARATUS FOR PRODUCING A GLASS GOB

(75) Inventors: Atsushi Uezaki, Oume (JP); Katsumi Utsugi, Tachikawa (JP); Junichi Watanabe, Tachikawa (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/970,681

(22) Filed: Oct. 5, 2001

(65) Prior Publication Data

US 2002/0062661 A1 May 30, 2002

(30) Foreign Application Priority Data

Oct. 6, 2000 (JP) .......................................... 2000-308489

(51) Int. Cl.[7] .............................................. C03B 19/10
(52) U.S. Cl. .............................. 65/66; 65/21.1; 65/21.2; 65/75; 65/76; 65/127; 65/126; 65/130; 65/141; 65/142; 65/181; 65/209

(58) Field of Search ................................. 65/21.1, 21.2, 65/66, 75, 76, 142, 127, 126, 130, 141, 181, 209

(56) References Cited

U.S. PATENT DOCUMENTS 1,128,175 A * 2/1915 Morf .......................... 65/21.2
1,617,598 A * 2/1927 Howard ....................... 65/130

FOREIGN PATENT DOCUMENTS

JP 10-194752 7/1998

* cited by examiner

Primary Examiner—Michael Colaianni
(74) Attorney, Agent, or Firm—Sughrue Mion, PLLC

(57) ABSTRACT

In a method of producing a glass gob by continuously dropping a molten glass 9 from a nozzle 2 in a dropping direction, a gas flow 20 is caused to continuously flow in the dropping direction along an outer peripheral surface of the nozzle 2 at a predetermined flow rate. The gas flow 20 applies a wind pressure to the molten glass 9 appearing from a nozzle end 2a of the nozzle 2 to drop the molten glass 9.

13 Claims, 4 Drawing Sheets

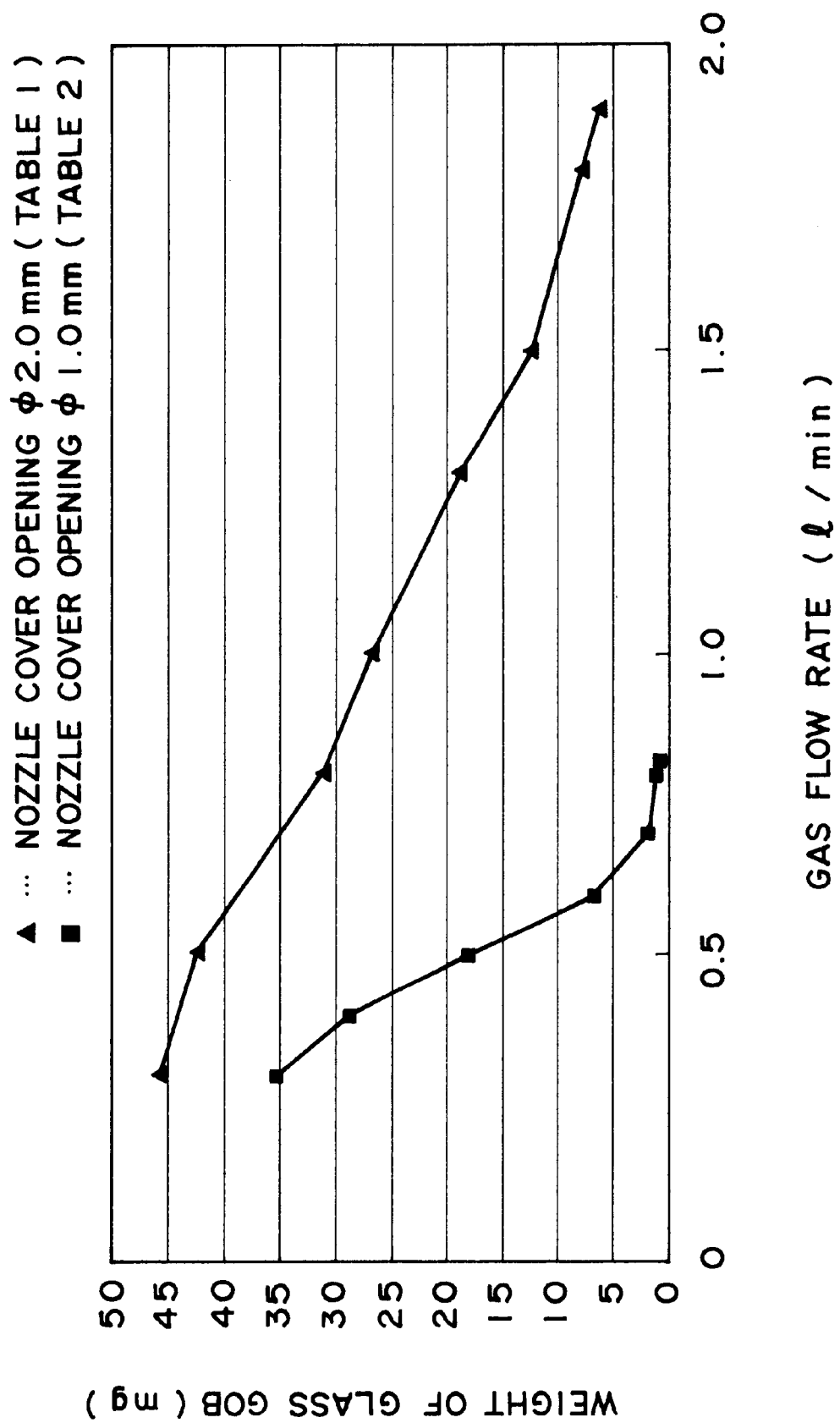

METHOD OF PRODUCING A GLASS GOB, METHOD OF PRODUCING A GLASS MOLDED PRODUCT, AND APPARATUS FOR PRODUCING A GLASS GOB

BACKGROUND OF THE INVENTION

This invention relates to a method of producing a glass gob to be subjected to press molding, a method of producing a glass molded product by pressing the glass gob, and an apparatus for producing the glass gob.

In order to produce an optical glass component, use has widely been made of a technique of press-molding a glass by the use of a die or a mold. Such technique includes a direct press method of directly pressing a molten glass gob and a reheating/pressing (RP) method of reheating and pressing a preform which has a shape approximate to that of a final or an end product.

Traditionally, the above-mentioned preform is prepared in the following manner. The molten glass is made to flow down from an outlet pipe and cut by a cutting tool such as a shear blade to obtain a molten glass gob having a predetermined weight. The molten glass gob is cooled into a glass gob to be directly used as the preform. Alternatively, the glass gob thus obtained is subjected to polishing before it is used as the preform. In the existing method of obtaining the glass gob by flowing down the molten glass from the outlet pipe, the weight of the glass gob is controlled by changing the diameter of a nozzle attached to an end of the outlet pipe. This means that the nozzle must be exchanged to another nozzle in order to produce the glass gob having a different weight. Furthermore, in order to reuse the nozzle once removed, a residual glass cooled and solidified in the nozzle must be eliminated.

In order to overcome the above-mentioned problem, the present applicant has already developed a method of blowing a gas to the molten glass before spontaneous falling of the molten glass from the nozzle, thereby forcibly drop down, as a molten glass drop, the molten glass having a particular weight as a dropping weight (see Japanese Unexamined Patent Publication No. H10-194752 (JP 10-194752 A, which will hereinafter be referred to as an earlier publication). In this method, the dropping weight of the molten glass drop is controlled by adjusting the timing of blowing the gas. By changing the timing, it is possible to continuously change the dropping weight from one to another. For example, if the gas is blown at a shorter time interval, the weight of the glass gob to be obtained is reduced. In the above-mentioned method, it is unnecessary to exchange the nozzle every time when a desirable dropping weight of the molten glass is changed from one to another. Upon press molding a video camera lens, a compact disk pickup lens, and so on, a small glass gob to be used as a preform is required. Such a small glass gob can be produced by this method.

The method disclosed in the earlier publication is excellent and useful as mentioned above. However, it is difficult to produce an extremely small or minute glass gob, which is further smaller in weight, with high weight accuracy. In the method disclosed in the earlier publication, the gas blown to the molten glass is guided to a nozzle portion by an air blow pipe. The air blow pipe is extended from an exterior of a heater through a lower opening of the heater to a nozzle end within the heater. Therefore, the gas blown to the molten glass has a temperature extremely lower than that of the molten glass.

The gas is intermittently blown to the molten glass at a predetermined timing corresponding to the dropping weight. Alternatively, in order to prevent the molten glass from wicking or wetting upwards along an outer peripheral surface of the nozzle (due to a capillary phenomenon or a flowing up movement caused by a gas flow), the gas is continuously blown relatively weakly at a relatively low pressure and, at a desired drop timing, the gas is blown relatively intensely at a relatively high pressure to forcibly drop the molten glass. In either event, the molten glass is dropped by relatively intensely blowing the gas at a controlled timing.

The present inventors have found out that, in order to obtain a glass gob having an extremely small weight with high weight accuracy by dropping the molten glass, it is important to keep a constant flow rate of the gas blown to the molten glass and to continuously flow the gas in a laminar flow condition. It has also been found out that, even upon occurrence of some fluctuation in flow rate of the gas, the influence of the fluctuation upon the weight accuracy of the glass gob is minimized under a particular condition. Furthermore, the present inventors have found out a method of setting the particular condition.

SUMMARY OF THE INVENTION

It is an object of this invention to provide a method of producing a glass gob with high weight accuracy.

It is a specific object of this invention to provide a method of producing an extremely small glass gob with high weight accuracy.

It is another object of this invention to provide a method of producing a glass molded product by the use of the above-mentioned glass gob.

It is still another object of this invention to provide an apparatus for producing the above-mentioned glass gob.

According to a first aspect of this invention, there is provided a method of producing a glass gob by successively dropping or dripping as molten glass drops a molten glass from a nozzle in a dropping direction, the method comprising the step of generating a gas flow continuously flowing in the dropping direction along an outer peripheral surface of the nozzle at a predetermined flow rate to apply a wind pressure or a blow/flow pressure upon the molten glass appearing from an end of the nozzle, thereby dropping the molten glass.

According to a second aspect of this invention, there is provided a method of producing a glass molded product, the method comprising the steps of preparing a glass gob by the use of the above-mentioned method in the first aspect, reheating the glass gob, and press-molding the glass gob to obtain the glass molded product.

According to a third aspect of this invention, there is provided an apparatus for producing a glass gob by dropping a molten glass as a molten glass drop, receiving the molten glass drop in a molding die, and molding the molten glass drop to produce the glass gob, the apparatus comprising a nozzle for flowing out the molten glass, a molding die for receiving the molten glass drop dropping down from the nozzle and molding the molten glass drop into the glass gob, a nozzle cover covering and surrounding an outer periphery of the nozzle to define a gas flow path between the nozzle cover and the nozzle and to define a nozzle cover opening between a nozzle cover end of the nozzle cover and a nozzle end of the nozzle, and gas supplying means for continuously supplying a gas of a predetermined flow rate or a predetermined quantity into the interior of the nozzle cover. The gas supplied into the interior of the nozzle cover passes through the gas flow path defined between the nozzle and the nozzle cover to be blown out through the nozzle cover opening towards the nozzle end so that a wind pressure of the gas blown out through the nozzle cover opening is applied to the molten glass appearing from the nozzle end protruding from the nozzle cover opening, thereby dropping the molten glass.

BRIEF DESCRIPTION OF THE DRAWING

FIG. 5 is a graph showing the relationship between the flow rate of a gas flow and the weight of a glass gob in specific examples of this invention.

DESCRIPTION OF THE PREFERRED EMBODIMENT

Figure 1:
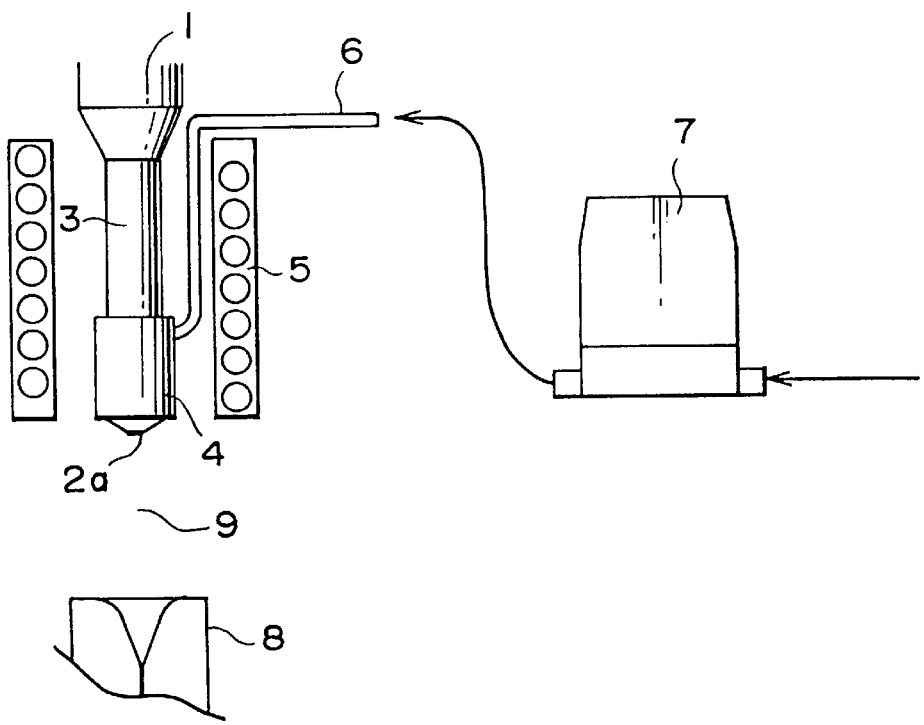
FIG. 1 is a view showing an apparatus for producing a glass gob according to one embodiment of this invention.

Now, this invention will be described in detail.

It is believed that a molten glass drops down from a nozzle end as a molten glass drop when the gravity is exerted as a downward force upon the molten glass flowing out from a nozzle and exceeds the force keeping the molten glass stay at the nozzle end. In order to form an extremely small or minute spherical glass preform from the molten glass drop, it is necessary to allow even an extremely small weight of the molten glass to drop down from the nozzle end. By the use of the nozzle having a small inner diameter, the molten glass drop can be reduced in weight. However, restriction is imposed upon the reduction in diameter of the nozzle. Specifically, a narrowest nozzle which can be obtained has an outer diameter of about 0.3 mm.

In this invention, the molten glass discharged from the nozzle end is continuously applied with a wind pressure in a downward direction, i.e., a dropping direction of the molten glass so that the downward force exerted upon the molten glass is increased. In this manner, even an extremely small amount of the molten glass can be dropped down. Specifically, the molten glass appearing from the nozzle with the nozzle end directed downward is continuously applied with a predetermined wind pressure in the downward direction so that the molten glass appearing from the nozzle drops down at a time instant when it reaches a predetermined weight. In this event, it is preferable that no turbulent flow takes place due to collision of gas flows caused to flow along an outer peripheral surface of the nozzle. For this purpose, [a plurality of gas flows are produced to flow along an outer peripheral surface of the nozzle so that,] in an area where the molten glass appearing from the nozzle is applied with the wind pressure, the gas flows are caused to flow through unidirectionally oriented paths in the downward direction (dropping direction). Specifically, in order to prevent the gas flows flowing along the outer peripheral surface of the nozzle from colliding with one another to form a turbulent flow, the gas flows are unidirectionally oriented so as to define flow paths of the gas flows at least over a predetermined distance in a longitudinal direction of the nozzle, i.e., the dropping direction of the molten glass. In this manner, the wind pressure is applied as mentioned above. Preferably, the gas flows are in a laminar flow condition. By continuously applying the wind pressure to the molten glass in the downward direction, the balance between the weight of the molten glass and the surface tension is given a downward bias (i.e., continuously applied with a predetermined downward force) so that a smaller weight of the molten glass drop is obtained. This phenomenon is repeated in a predetermined cycle. It is noted here that, if the gas flows for applying the wind pressure to the molten glass is in a turbulent flow condition, the weight of the molten glass drop can not be stabilized or kept constant. Taking this into consideration, the gas flows blown to the molten glass are put into the laminar flow condition to prevent the decrease in weight accuracy. In the above-mentioned method disclosed in the earlier publication, the gas is blown in an oblique direction with respect to the nozzle. Therefore, the gas flows in different directions form a turbulent flow when they are combined or gathered at the nozzle end. This makes it difficult to stably obtain a glass gob, particularly, an extremely small glass gob with high weight accuracy. In this invention, the gas flows are caused to continuously flow in the longitudinal direction of the nozzle at a predetermined flow rate to put the gas flows at the nozzle end into the laminar flow condition. In this manner, it is possible to stably produce the glass gob, particularly, the extremely small glass gob with high weight accuracy.

Furthermore, in order to stably keep the gas flows in the laminar flow condition and to apply, in the dropping direction, a more uniform wind pressure to the molten glass appearing from the nozzle end, it is preferred that the gas flows are made to flow along a whole of the outer peripheral surface of the nozzle. In case where the gas flows are caused to flow along the outer peripheral surface of the nozzle, the gas flows do not essentially flow over an entire region of the outer peripheral surface of the nozzle. The effect is obtained if, at least at the nozzle end, the gas flows are kept in parallel to the longitudinal direction of the nozzle. In order to flow the gas flows in the dropping direction of the molten glass, the flow paths of the gas flows are preferably provided with a flow regulator for orienting the gas flows in parallel to one another. As the flow regulator, use may be made of a slit or a plate-like member arranged in parallel to the dropping direction and located in the flow path.

The flow paths may be formed in the following manner. The outer peripheral surface of the nozzle is covered and surrounded by a nozzle cover to define the flow path for the gas flows between the nozzle and the nozzle cover and to form a nozzle cover opening between a nozzle cover end of the nozzle cover and the nozzle end of the nozzle. Preferably, the gas flows are caused to flow in a state where the nozzle end is protruded beyond the nozzle cover end. With this structure, it is possible to prevent the molten glass appearing from the nozzle end from adhering to the nozzle cover end. In this case, at least a gap between the nozzle end and the nozzle cover end is preferably rendered uniform throughout an entire circumference of the nozzle. In this embodiment, the nozzle has a cylindrical shape and the nozzle cover has an inner wall of a cylindrical shape corresponding to the shape of the nozzle. The nozzle end and the nozzle cover end are arranged with their center axes coincident with each other so that the above-mentioned gap is uniform. By keeping the above-mentioned gap uniform, the wind pressure applied to the molten glass is more uniform around the center axis of the nozzle. It is therefore possible to prevent various disadvantages from being caused by nonuniformity in wind pressure, for example, wetting of the outer peripheral surface of the nozzle by the molten glass appearing from the nozzle end and occurrence of striae in the glass drop by the rotation of the molten glass at the nozzle end. In addition, since a stable wind pressure can be applied to the molten glass, it is possible to prevent the decrease in weight accuracy of the molten glass drop. Preferably, the above-mentioned gap is uniform not only in the vicinity of the nozzle cover opening but also in an area between a gas supply port for supplying the nozzle cover with the gas for generating the gas flows and the nozzle cover opening. It is noted here that the gap between the nozzle and the nozzle cover may be changed in the longitudinal direction of the nozzle. At the nozzle cover opening, it is preferable that the gap is uniform in the longitudinal direction of the nozzle end and has a width within a range between 0.1 and 5 mm, preferably between 0.1 and 3 mm, more preferably between 0.15 and 2 mm.

As compared with free or spontaneous dropping, the above-mentioned method of producing the glass gob is advantageous in that a predetermined weight of the glass gob to be obtained can be changed by altering the flow rate of the gas flows without exchanging the nozzle. In addition, the extremely small glass gob can be produced with high weight accuracy. In case where a relatively small glass gob is produced, a spherical glass gob can be obtained due to the surface tension because the influence of deformation due to the weight of the glass gob is small. By float molding of the molten glass also, the spherical glass gob can also be obtained. The spherical glass gob is suitable as a preform upon precision press molding of a lens or the like. The method of producing a glass gob according to this invention is adapted for use in production of a spherical or a substantially spherical glass gob having a diameter between 0.5 and 8 mm with high weight accuracy. A more preferable diameter is between 0.8 and 6.5 mm.

As compared with a down cutting method in which a lower part of the molten glass flowing out from the nozzle is received on a receiving die and the receiving die is rapidly lowered to cut the molten glass so that the glass gob is received on the receiving die and a spontaneous dropping method in which the molten glass spontaneously drops from the nozzle without applying the wind pressure so that the glass gob is obtained, this invention is particularly effective in case where a glass gob having an extremely small weight is produced. Specifically, in the down cutting method, a part of the weight of the molten glass is supported by the receiving die and this support of the weight is quickly released at a predetermined timing to cut the molten glass. Therefore, as compared with the spontaneous dropping method, the weight of the glass upon cutting is heavy. Comparison between the spontaneous dropping method and this invention has already been described. As described above, it is impossible in the spontaneous dropping method to obtain the glass gob having a weight not greater than 35 mg even if a nozzle having a minimum outer diameter is used. In case where the above-mentioned method disclosed in the earlier publication is used, the extremely small glass gob having a weight of 11 mg at minimum can be obtained but high weight accuracy can not be achieved. In this invention, it is possible to stably produce a glass gob having a weight between 1 and 35 mg with weight accuracy within a range of ±1% of a desired weight. When the weight of the glass gob is equal to 10 mg or less, the ratio of an area where the molten glass is contacted with the nozzle end is great with respect to the surface area of the molten glass appearing from the nozzle end. Therefore, the rotation of the molten glass due to the wind pressure is difficult to occur so that the striae caused by the rotation can be suppressed. On the other hand, with the reduction in weight of the glass gob, stable dropping becomes difficult. In order to obtain the glass gob having high weight accuracy by stable dropping, the weight of the glass gob is equal to 0.8 mg or more, preferably 3 mg or more, more preferably 5 mg or more. Thus, the weight of the glass gob in this embodiment is between 1 and 35 mg, preferably between 3 and 34 mg, more preferably between 5 and 10 mg. In the above-mentioned range, the weight accuracy can be suppressed to a range of ±1% or less, preferably ±0.5% or less.

The weight of the glass gob and the cycle of dropping can be selected by adjusting the inner and the outer diameters of the nozzle, the viscosity of the molten glass, and the flow rate of the gas flows, taking into account the characteristics of the glass. In order to prevent the decrease in weight accuracy due to the fluctuation in flow rate of the gas flows and to achieve the above-mentioned high weight accuracy, the following is desired. Specifically, taking into account the characteristics of the glass, the inner and the outer diameters of the nozzle and the viscosity of the molten glass are selected so that the glass gob having a weight greater than a desired weight is obtained. Then, the flow rate of the gas flows is increased. With the increase of the flow rate, the weight of the glass gob is decreased. Finally, the tendency appears such that the decrease in weight of the glass gob in response to the small increase in flow rate is reduced. The flow rate is obtained at which the ratio of the decrease in weight and the increase in flow rate falls within a predetermined range. Thus, the relationship between the weight of the glass gob and the flow rate is obtained and then the flow rate corresponding to the desired weight of the glass gob is selected. Such selection brings about an improved weight accuracy of the glass gob.

Upon dropping the molten glass of an extremely small amount, the gas flows preferably have a temperature within a range of T±50° C., preferably T±20° C., more preferably T±10° C., where T represents the temperature of the nozzle end. If the temperature of the gas flows is lower than the above-mentioned range, the viscosity of the glass is increased so that the glass tends to become stringy upon dropping. If the temperature of the gas flows is higher than the above-mentioned range, there arise various problems such as occurrence of striae in the glass drop and volatilization of volatile components contained in the glass. In order to make the temperature of the gas flows close to the temperature of the nozzle end, it is desired to perform sufficient heat exchange between the gas in the gas flows and the nozzle. For this purpose, the flow path for the gas flows is formed between the nozzle and the nozzle cover to bring the gas into contact with the outer peripheral surface of the nozzle.

As the gas supplied for generation of the gas flows, use may be made of an inactive gas (including a mixed gas comprising different inactive gases), a nitrogen gas, a mixed gas comprising the inactive gas and the nitrogen gas, air, and so on. Preferably, the inactive gas (including the mixed gas comprising different inactive gases), the nitrogen gas, the mixed gas comprising the inactive gas and the nitrogen gas are used. It is desired that these gases are clean.

For the glass to which this invention is applicable, the temperature corresponding to the viscosity allowing the molten glass to flow out from the nozzle must be higher than the liquid phase temperature. Specifically, this invention is advantageously applicable to those glasses having a liquid phase temperature not higher than 1000° C. In order to use the glass gob as a preform for precision press molding, those glasses having a sagging point not higher than 580° C. are preferable. For example, use is preferably made of a borosilicate glass containing an alkali metal oxide, the borosilicate glass containing lithium oxide as the alkali metal oxide, a phosphate glass containing an alkali metal oxide, the phosphate glass further containing at least one metal oxide selected from metal oxides including a zinc oxide and an alkaline earth metal oxide. More specifically, use is preferably made of an aluminoborosilicate glass containing at least one of $Li_2O$, CaO, BaO, and $La_2O_3$ and a borosilicate glass containing at least one of $Li_2O$, CaO, $ZrO_2$, $TiO_2$, and $Nb_2O_5$.

As described above, even the above-mentioned preferable glasses may cause striae to occur as a result of volatilization or foaming on a glass surface in a high temperature region (in a low viscosity region) higher than an appropriate temperature range. On the other hand, the glass may become stringy upon dropping in a low temperature region (in a high viscosity region) lower than the appropriate temperature range. Therefore, it is preferable that the molten glass flows out at a viscosity between 5 and 20 poises.

By the use of a widely-used molding die, such as a venturi tube and a receiving die having a depressed portion (i.e., a surface receiving the molten glass drop) and at least one blowout port (typically, a plurality of blowout ports) for blowing a floating gas above the depressed portion, the molten glass drop is held afloat or substantially afloat by spouting gas flows from an under side, molded, and cooled to be solidified. In this process, the floating gas flows are given directionality to control the rotating direction and the rotation speed of the molten glass drop so that the molten glass drop can be molded into a glass gob having a desired shape. The glass gob obtained in this manner is free from defects such as surface wrinkles. If the molten glass drop is rotated in random directions, the shape approximate to a true sphere is obtained. The glass gob obtained as mentioned above can be used as a preform for press molding of a final product, i.e, a precision press-molding preform.

The glass gob obtained as mentioned above is reheated in a nonoxidizing gas atmosphere so that its viscosity falls within a range between $10^7$ and $10^9$ poises. Then, by the use of a press molding die very precisely shaped in conformity with the shape of the final product, the glass gob is subjected to precision press molding. On the press molded product, a molding surface of the press molding die is precisely transferred. Therefore, the press molded product can be used as the final product which does not require grinding or polishing. If necessary, the final product may be provided with an optical thin film formed on its surface.

For example, this invention is advantageously applicable to production of an optical lens such as a camera lens, a video camera lens, a photographic lens, a coupling lens for optical communication, an eyeglass lens, a pickup lens of a compact disk player, a pickup lens of a digital video disk (DVD) and a minute optical device such as a phase-grating low-pass filter, a color filter, a phase-grating filter, an anamorphic lens, a lenticular lens, a grating, a prism, a zone plate, a Fresnel lens, and a holographic lens.

Now, description will be made of examples of this invention with reference to the drawing.

Figure 2:
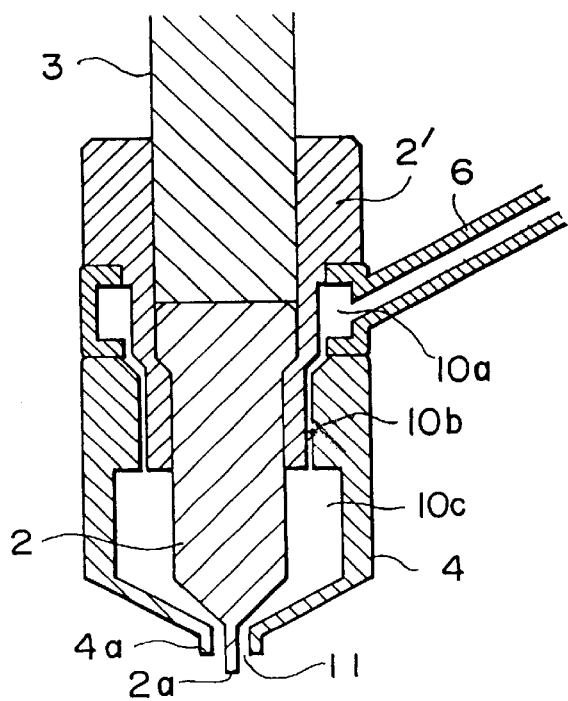
FIG. 2 is a view showing a nozzle and a nozzle cover of the apparatus illustrated in FIG. 1.

Referring to FIG. 1, a glass gob producing apparatus has a molten glass supplying section 1. Above the molten glass supplying section 1, a glass melting furnace (not shown) stores a molten glass as a material of a glass gob. The molten glass is supplied from the glass melting furnace into the molten glass supplying section 1. As illustrated in FIGS. 1 and 2, the glass gob producing apparatus further comprises a nozzle 2 which is for flowing out and dropping down the molten glass and which has an axis kept in the vertical direction (i.e., the gravitational direction), a molten glass introduction pipe 3 supplied with the molten glass from the molten glass supplying section 1 for introducing the molten glass into the nozzle 2. In the example illustrated, a nozzle cover 4 surrounds and covers a side surface or an outer peripheral surface of the nozzle 2 except a nozzle end 2a while a high-frequency induction heating section 5 surrounds side surfaces of the molten glass introduction pipe 3 and the nozzle cover 4. The molten glass introduction pipe 3 to be brought into contact with the molten glass has an inner wall made of platinum or platinum alloy. The nozzle cover 4 has a nozzle cover end 4a. Between the nozzle cover end 4a and the nozzle end 2a, a nozzle cover opening 11 is defined. Through the nozzle cover opening 11, the nozzle end 2a protrudes beyond the nozzle cover end 4a of the nozzle cover 4.

The nozzle cover 4 is connected to one end of a gas supply pipe 6 for supplying a gas to be blown out from the nozzle cover opening 11. The gas supply pipe 6 has the other end connected through a mass flow controller 7 to a gas cylinder (not shown).

A plurality of molding dies 8 are arranged on a turntable (not shown). The turntable is intermittently rotated to successively transfer the molding dies 8 to a position under the nozzle end 2a in the vertical direction. Each molten glass drop 9 successively drops down from the nozzle end 2a and is received on the molding dies 8 to be molded into each glass gob. When the glass gobs are removed from the molding dies 8, each of the molding dies 8 is again transferred to the position under the nozzle end 2a to receive another molten glass drop 9. Thus, the molten glass drops 9 are successively dropped down and received on the circulating molding dies 8 to be molded into the glass gobs. Thus, the glass gobs are continuously produced.

Referring to FIG. 2, the gas supply pipe 6 supplies a gas to each flow path 10a formed throughout an outer periphery of a nozzle holder 2'. Each flow path 10a is connected to each slit 10b formed between the outer peripheral surface of the nozzle holder 2' and the nozzle cover 4 at equal intervals throughout the outer periphery of the nozzle holder 2'. The gas supplied to the flow path 10a passes through the slit 10b and is introduced into a flow path 10c defined between the outer peripheral surface of the nozzle 2 and the nozzle cover 4 to be blown out through the nozzle cover opening 11. It is noted here that each slit 10b extends in an axial direction of the nozzle 2. The gas passes through each slit 10b so that gas flows produced by the movement of the gas are regulated to be oriented downward in the vertical direction along the outer peripheral surface of the nozzle 2. The slit 10b is formed by a plurality of flow regulation plates (not shown) similar to those described later in conjunction with FIGS. 4A through 4C.

Figure 3:
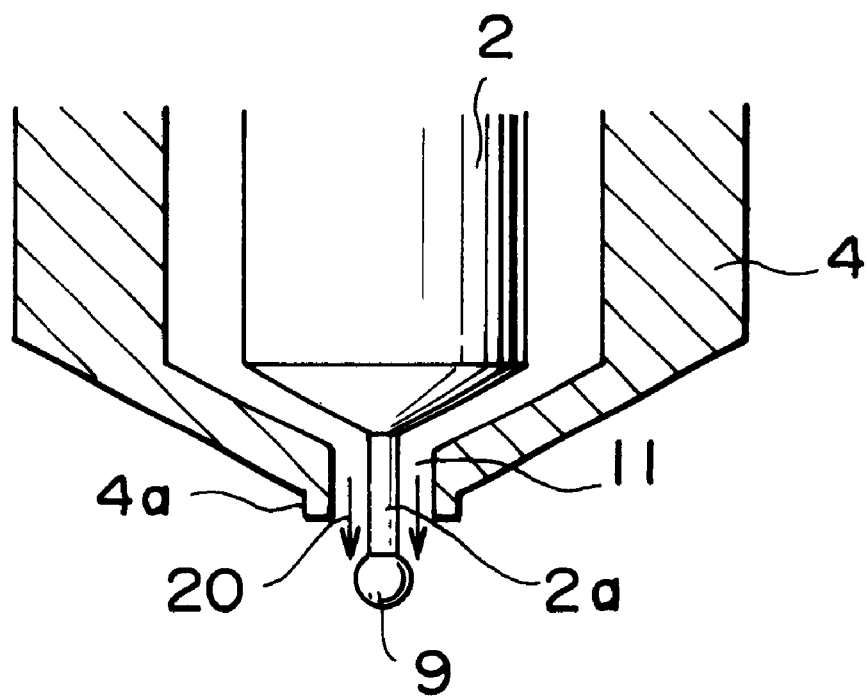
FIG. 3 is an enlarged view of a nozzle end and a nozzle cover opening of the apparatus illustrated in FIGS. 1 and 2.

Referring to FIG. 3, the nozzle 2 and the nozzle cover 4 are squeezed or reduced at their end portions in outer diameter and in inner diameter into the nozzle end 2a and the nozzle cover end 4a, respectively. The illustrated nozzle cover opening 11 is formed between the nozzle end 2a and the nozzle cover end 4a. At the nozzle cover opening 11, the gas flows are increased in velocity because the flow path is reduced in sectional area. At the nozzle end 2a also, the gas flows 20 are oriented downward in the vertical direction. At the nozzle end 2a, the molten glass 9 flowing down through the nozzle 2 is grown into a drop-like shape. The surface of the molten glass 9 is applied with a vertically-downward wind pressure exerted by the gas flows 20. In the spontaneous dropping without the gas flows, dropping occurs when the gravity applied upon the molten glass 9 appearing from the nozzle end 2a becomes greater than the force keeping the molten glass stay at the nozzle end 2a by surface tension and the like. According to this invention, the molten glass 9 is applied with the vertically-downward wind pressure by the gas flows 20 continuously flowing at a predetermined flow rate so that the molten glass 9 can be dropped at a weight smaller than that in the spontaneous dropping. The flow rate of the gas supplied to the apparatus is kept constant by the mass flow controller 7 so that the flow rate of the gas flows flowing from the nozzle cover opening 11 downward in the vertical direction is also kept constant. Throughout the outer periphery of the nozzle end 2a, the gas flows 20 are oriented downward in the vertical direction in which the molten glass 9 drops down. Therefore, the molten glass 9 appearing from the nozzle end 2a is applied with a stable wind pressure. Thus, the molten glass 9 can be applied with the wind pressure by the gas flows in the laminar flow condition. Therefore, the molten glass drops are constant in weight so that the glass gobs having high weight precision can be obtained. If the gas flows are not rectified in direction at the nozzle end 2a, the gas flows will collide with one another to produce a turbulent flow. In this event, the molten glass is applied with the wind pressure unstable in magnitude and direction. The wind pressure unstable in magnitude and direction causes the fluctuation in drop timing upon every dropping. This results in fluctuation in weight of the glass gobs.

Figure 4A:
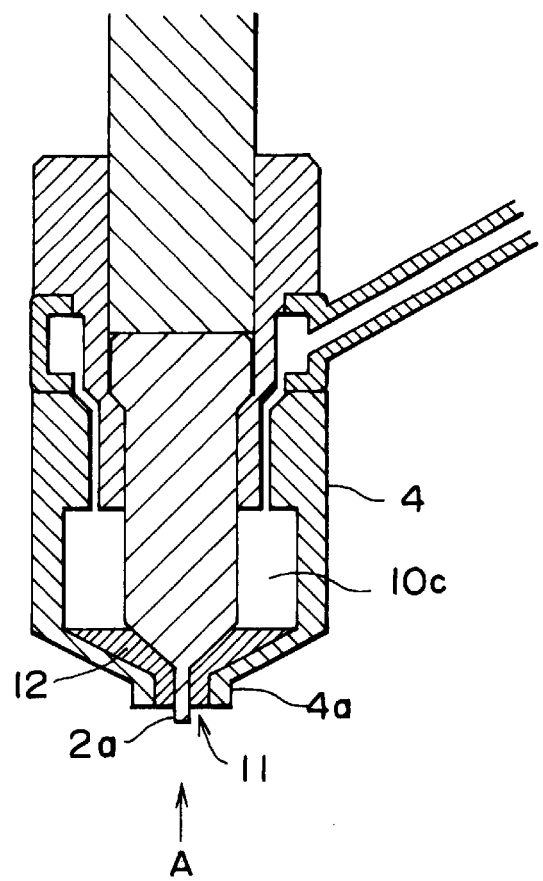
FIGS. 4A, 4B, and 4C are a sectional view, a plan view, and an enlarged view showing a modification of the nozzle and the nozzle cover, respectively.
Figure 4B:
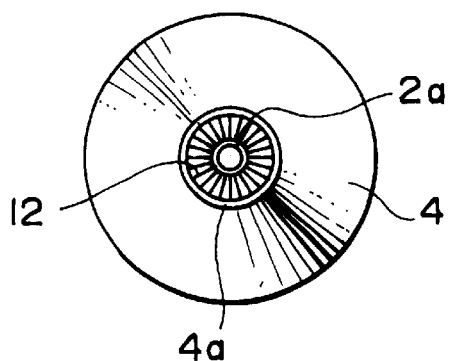
Figure 4C:
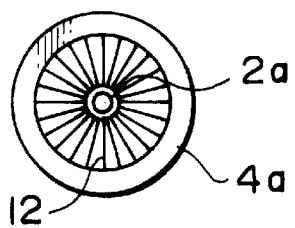

Referring to FIGS. 4A, 4B, and 4C, a plurality of flow regulation plates 12 are arranged in the nozzle cover opening 11 formed between the nozzle end 2a and the nozzle cover end 4a and in a part of the flow path 10c. With this structure, the gas flows can be oriented in parallel to one another and can be stably kept in the laminar flow condition.

The flow regulation plates 12 are arranged adjacent to one another at an interval within a range preferably between 0.1 and 0.5 mm. The flow regulation plates 12 are preferably thin so as not to disturb the gas flows. The number of the flow regulation plates 12 and their positions are not restricted to those illustrated in FIGS. 4A through 4C. For example, the flow regulation plates 12 may be formed only between the nozzle end 2a and the nozzle cover end 4a. Alternatively, the flow regulation plates 12 may extend upward to an intermediate position of the flow path 10c in FIG. 4A.

As specific examples, a borosilicate glass having a sagging point not higher than 580° C. and a liquid phase temperature not higher than 1000° C. and containing $Li_2O$ was melted. By the use of the glass gob producing apparatus illustrated in FIGS. 1 through 3, the glass gobs were continuously produced in the following manner.

EXAMPLE 1

The nozzle cover opening 11 had a diameter of φ2.0 mm. The nozzle end 2a had an outer diameter of φ0.6 mm and an inner diameter of φ0.4 mm. By making the center of the nozzle cover opening 11 coincident with the center of the nozzle 2, each uniform gap of 0.7 mm was formed around the outer peripheral surface of the nozzle 2 to serve as a flow path for the gas flows. Along the outer peripheral surface of the nozzle 2, a nitrogen gas was caused to flow downward in the vertical direction. The nozzle 2 was kept at a temperature of 830° C. so that the glass discharged from the nozzle end 2a had a viscosity within a range between 5 and 20 poises. Table 1 shows the weight, the weight accuracy (weight variation/average weight), the diameter, and the dropping interval for spherical glass gobs obtained when the flow rate of the gas flows were changed within a range between 0.3 and 1.9 l/min.

TABLE 1

| Flow Rate of Gas flow (l/min) | Weight of Glass Gob (mg) | Weight Accuracy (%) | Diameter of Glass Gob (mm) | Dropping Interval (sec) | Condition of Glass Gob |
|---|---|---|---|---|---|
| 0.3 | 45.7 | ±0.22 | 3.00 | 3.22 | no striae |
| 0.5 | 42.7 | ±0.12 | 2.94 | 3.13 | no striae |
| 0.8 | 31.5 | ±0.32 | 2.65 | 2.70 | no striae |
| 1.0 | 27.2 | ±0.37 | 2.53 | 2.53 | no striae |
| 1.3 | 19.2 | ±0.52 | 2.25 | 2.18 | no striae |
| 1.5 | 12.6 | ±0.40 | 1.96 | 1.76 | no striae |
| 1.8 | 8.0 | ±0.85 | 1.68 | 1.49 | no striae |
| 1.9 | 6.5 | ±1.00 | 1.57 | 1.35 | no striae |

As is obvious from Table 1, the spherical glass gobs having weights between 6.5 and 45.7 mg and diameters between 1.57 and 3.00 mm were obtained by changing the flow rate of the gas flows. In this case, the weight accuracy of the glass gobs is within ±1%. Since the flow rate of the gas flows can be controlled to be continuously increased or decreased, the weights of the glass gobs can be adjusted to any desired value. Therefore, the glass gobs having high weight accuracy can be obtained. Since the molten glass flows out from the nozzle 2 at a predetermined velocity, the dropping interval is shortened in order to obtain a glass gob having a light weight. Therefore, in synchronism with the dropping interval corresponding to the flow rate of the gas flows, the molding die 8 for receiving and molding the molten glass drop is loaded and unloaded to and from a position at which the molten glass drop is received. The molding die 8 has the receiving surface for receiving the molten glass drop. The receiving surface is provided with a plurality of blowout ports through which the floating gas is blown out. The molten glass drop received on the receiving surface is kept afloat to be molded into the spherical glass gob. The glass gobs thus obtained were free from striae and other defects unfavorable as an optical glass and are therefore suitable as a precision press molding preform.

EXAMPLE 2

Next, the nozzle cover opening 11 of the apparatus was reduced in diameter to φ1.0 mm. With other conditions kept unchanged, glass gobs were produced. Table 2 shows the values similar to Table 1 but obtained in this example.

TABLE 2

| Flow Rate of Gas flow (l/min) | Weight of Glass Gob (mg) | Weight Accuracy (%) | Diameter of Glass Gob (mm) | Dropping Interval (sec) | Condition of Glass Gob |
|---|---|---|---|---|---|
| 0.3 | 35.2 | ±0.28 | 2.75 | 3.08 | no striae |
| 0.4 | 28.8 | ±0.52 | 2.58 | 2.55 | no striae |
| 0.5 | 18.1 | ±0.55 | 2.21 | 1.65 | no striae |
| 0.6 | 6.7 | ±0.75 | 1.58 | 0.64 | no striae |
| 0.7 | 2.0 | ±0.80 | 1.06 | 0.20 | no striae |
| 0.8 | 1.4 | ±0.88 | 0.94 | 0.13 | no striae |
| 0.825 | 1.0 | ±0.95 | 0.84 | 0.12 | no striae |

As seen from Table 2, the glass gobs having the weights between 1.0 and 35.2 mg could be obtained with weight accuracy within ±0.95% by setting the flow rate of the gas flows within a range between 0.3 and 0.825 l/min,. Like in Table 1, the weight of the glass gob is reduced and the dropping interval of the glass is shortened by increasing the flow rate of the gas flows. Furthermore, by reducing the diameter of the nozzle cover opening 11, the sectional area of the flow path for the gas flows is reduced. With this structure, the velocity of the gas flows can be increased although the flow rate of the gas flows is unchanged. It is therefore possible to increase the wind pressure applied to the molten glass appearing from the nozzle end 2a. Thus, it has been confirmed that, although the diameter of the nozzle end 2a is unchanged, the molten glass having a smaller weight can be dropped. This means that various weights of the glass gobs can be obtained without any change of the nozzle 2 or nozzle end 2a.

In the glass gobs in Table 2, no defects such as striae were observed. Therefore, these glass gobs were suitable as a precision press molding preform. In order to remove internal strain, the glass gob may be subjected to an appropriate treatment such as annealing.

The glass gobs obtained in Examples 1 and 2 were used as preforms, heated in a nitrogen atmosphere to a temperature at which the glass has a viscosity between $10^7$ and $10^9$ poises, and press molded by a precision press molding die to produce an optical component, such as an aspherical lens, which has high accuracy and does not require grinding and polishing after press molding. The glass gobs prepared in Examples were high in weight accuracy so that the press molded products obtained therefrom were also high in accuracy. Furthermore, it is possible to provide the extremely small preform having high weight accuracy, which has heretofore been more difficult to obtain. Therefore, this invention is advantageously applicable to preparation of a press molding preform for an extremely small optical device with high profile accuracy.

Referring to FIG. 5, the relationship between the flow rate of the gas flows and the weight of the glass gob is illustrated for each of the results in Tables 1 and 2. It is clearly seen from the graph corresponding to Table 2 that, the weight of the glass gob is decreased with the increase in flow rate of the gas flows but the decrease in weight of the glass gob in response to the change in flow rate is finally reduced around a certain flow rate. By flowing the gas flows around the certain flow rate, a differential rate in weight of the glass gob due to a variation in flow rate can be reduced. In other words, the weight of each glass gob can be kept substantially constant by selecting the flow rate.

In Examples, nitrogen was used as the gas for generating the gas flows. However, use may be made of any other appropriate gas, such as an inactive gas.

The inner and the outer diameters of the nozzle end and the distance between the nozzle cover end and the nozzle end (the gap as the nozzle cover opening) are not restricted to those values in Examples but may be appropriately modified.

The slit 10b illustrated in FIG. 2 may be a uniform cylindrical gap without the flow regulation plates.

By the use of the glass gob producing apparatus illustrated in FIG. 1 and FIGS. 4A through 4C with the flow regulation plates 12, the gas flows can be oriented in parallel to one another and stably kept in the laminar flow condition. As a consequence, the fluctuation in weight of the glass gob is suppressed. The interval of the flow regulation plates 12 is not restricted to that illustrated in FIGS. 4B and 4C but may be appropriately modified.

As described above, according to the method and the apparatus for producing a glass gob in this invention, it is possible to produce a glass gob having high weight accuracy with high productivity. The press molding preform comprising the glass gob is prepared by the method or the apparatus to be press molded. In this manner, the press molded product having high accuracy can be obtained because the weight of the press molding preform can be precisely matched with the weight of the press molded product. In particular, this invention is advantageously applicable to production of the extremely small glass gob.

What is claimed is:

1. A method of producing a glass gob by successively dropping molten glass as molten glass drops from a nozzle in a dropping direction, said method comprising the steps of:

(a) causing a gas flow to continuously flow in the dropping direction at a constant flow rate along an outer peripheral surface of the nozzle so that the gas flow is propagated along an longitudinal direction of the nozzle and forms laminar and parallel flows at an end of the nozzle; and (b) applying a wind pressure to the molten glass at the end of the nozzle to drop the molten glass in for forming of the molten glass drops.

2. A method as claimed in claim 1, wherein the step (a) of causing the gas flow to continuously flow in the dropping direction comprises the steps of:

(a1) arranging a flow regulator within paths of the gas flow; and (a2) allowing the gas flow to pass through the flow regulator to regulate the gas flow into the laminar and parallel flows along the longitudinal direction of the nozzle.

3. A method as claimed in claim 1, wherein the step (a) comprises the step of:

(a11) surrounding a nozzle cover outside of the outer peripheral surface of the nozzle to form the paths of the gas flow between the nozzle cover and the nozzle;

(a12) arranging a flow regulator within a gap between the nozzle cover and the outer peripheral surface of the nozzle to continuously guide the gas flow in the longitudinal direction of the nozzle and to regulate the gas flow into the laminar and parallel flows at the end of the nozzle; and (a13) allowing the gas flow to pass through the flow regulator to regulate the gas flow into the laminar and parallel flows along the longitudinal direction of the nozzle.

4. A method as claimed in claim 3, wherein the flow regulator is structured by either a slit member or a plate-like member arranged in parallel to the dropping direction and located in the paths.

5. A method as claimed in claim 4, wherein the gap between the nozzle cover and the outer peripheral surface of the nozzle is uniformly divided by the flow regulator throughout an entire circumference of the nozzle.

6. A method as claimed in claim 1, wherein the step (b) comprises the steps of:

supplying the laminar and parallel flows to the end of the nozzle to make the molten glass appear at the end of the nozzle; and applying the wind pressure to the molten glass at the end of the nozzle to drop the molten glass as the molten glass drops.

7. A method as claimed in claim 1, wherein said glass gob has a weight between 1 and 35 mg.

8. A method as claimed in claim 1, wherein said molten glass is dropped by setting said flow rate so that the variation in weight of said glass gob in response to small variation in flow rate of said gas flow falls within a range of ±1% of a desired weight of said glass gob.

9. A method as claimed in claim 1, wherein said gas flow has a temperature within a range of T±50° C. where T represents the temperature of said nozzle end.

10. A method as claimed in claim 1, wherein said glass gob is used as a precision press molding preform.

11. A method of producing a glass molded product, said method comprising the steps of preparing a glass gob by the use of the method claimed in claim 1, reheating said glass gob, and press-molding said glass gob to obtain said glass molded product.

12. A method as claimed in claim 2, wherein said glass gob has a weight between 1 and 35 mg.

13. A method as claimed in claim 3, wherein said glass gob has a weight between 1 and 35 mg.

* * * * *